United States Patent
Wu

(10) Patent No.: US 8,698,997 B2
(45) Date of Patent: *Apr. 15, 2014

(54) STEREOSCOPIC IMAGE PRINTING DEVICE WITH ENHANCED POSITIONING ACCURACY AND RELATED PRINTING METHOD

(75) Inventor: Wen-Yue Wu, Tainan (TW)

(73) Assignee: Hiti Digital, Inc., New Taipei (TW)

( * ) Notice: Subject to any disclaimer, the term of this patent is extended or adjusted under 35 U.S.C. 154(b) by 447 days.

This patent is subject to a terminal disclaimer.

(21) Appl. No.: 13/053,165

(22) Filed: Mar. 21, 2011

(65) Prior Publication Data

US 2012/0154770 A1    Jun. 21, 2012

(30) Foreign Application Priority Data

Dec. 21, 2010    (TW) .............................. 99144909 A

(51) Int. Cl.
G03B 27/32    (2006.01)
G03B 27/00    (2006.01)

(52) U.S. Cl.
USPC ............................................. 355/22; 355/18

(58) Field of Classification Search
CPC ..... G03B 35/00; G03B 35/14; G02B 27/2214
USPC .................... 355/18, 22; 348/42, 59; 356/463
See application file for complete search history.

(56) References Cited

U.S. PATENT DOCUMENTS 5,528,420 A * 6/1996 Momochi ..................... 359/463
8,320,041 B2    11/2012 Uehara

FOREIGN PATENT DOCUMENTS

| CN | 1268139 C | 8/2006 |
| EP | 1245120 B1 | 7/2004 |
| TW | 560617 | 11/2003 |
| TW | 200940365 | 10/2009 |

* cited by examiner

*Primary Examiner* — Peter B Kim

(74) *Attorney, Agent, or Firm* — McClure, Qualey & Rodack, LLP

(57) ABSTRACT

A stereoscopic image printing device includes an actuating unit for moving a grating structure, and a positioning module. The positioning module includes a plurality of shelters, a planar light source for emitting light to pass through the grating structure and an interval between the adjacent shelters, and a photosensitive component for receiving the light passing through the grating structure and the interval between the adjacent shelters, so as to generate a corresponding optical intensity signal. The printing device further includes a controller coupled to the actuating unit and the photosensitive component for controlling the actuating unit to move the grating structure according to the optical intensity signal generated by the photosensitive component.

13 Claims, 4 Drawing Sheets

STEREOSCOPIC IMAGE PRINTING DEVICE WITH ENHANCED POSITIONING ACCURACY AND RELATED PRINTING METHOD

BACKGROUND OF THE INVENTION

1. Field of the Invention

The present invention relates to a stereoscopic image printing device and a related printing method, and more particularly, to a stereoscopic image printing device with enhanced positioning accuracy and a related printing method.

2. Description of the Prior Art

Conventional stereoscopic image printing device is printed with the interlaced pattern on a grating plate for generating stereoscopic image. The grating plate is made of transparent material, and the interlaced pattern is designed according to parameters of the grating plate, such as a width and a density of gratings on the grating plate. A print head is used to transfer the interlaced pattern onto the correct position of the grating plate with a positioning module having positioning function. However, structure of the conventional positioning module is complicated, so that the conventional positioning module is unpopular due to drawbacks of expensive cost, inconvenient operation and huge volume.

SUMMARY OF THE INVENTION

The present invention provides a stereoscopic image printing device with enhanced positioning accuracy and a related printing method for solving above drawbacks.

According to the claimed invention, a stereoscopic image printing device includes an actuating unit for moving a grating structure, a positioning module and a controlling unit. The positioning module includes a plurality of shelters disposed on a side of the grating structure, a planar light source disposed on the other side of the grating structure for emitting light to pass through the grating structure and an interval between the adjacent shelters, and a photosensitive component disposed on the side of the grating structure for receiving the light emitted from the planar light source passing through the grating structure and the interval between the adjacent shelters so as to generate a corresponding optical intensity signal. The controlling unit is coupled to the actuating unit and the photosensitive component for controlling the actuating unit to move the grating structure according to the optical intensity signal generated by the photosensitive component.

According to the claimed invention, the stereoscopic image printing device further includes a print head coupled to the controlling unit for transferring a target image datum onto a corresponding position of the grating structure according to a control signal transmitted from the controlling unit.

According to the claimed invention, the target image datum is an interlaced image datum.

According to the claimed invention, the photosensitive component is a single point photosensitive component, and the optical intensity signal generated by the single point photosensitive component substantially conforms to a sine wave signal.

According to the claimed invention, the positioning module further comprises a condenser disposed between the plurality of shelters and the photosensitive component.

According to the claimed invention, a width of each shelter is substantially smaller than a grating width of the grating structure.

According to the claimed invention, a distance between the adjacent shelters is substantially equal to a distance between the adjacent gratings of the grating structure.

According to the claimed invention, a moving direction of the grating structure is substantially perpendicular to an orientation of the shelters.

According to the claimed invention, a stereoscopic image printing method includes disposing a plurality of shelters on a side of a grating structure, moving the grating structure relative to the plurality of shelters, a planar light source emitting light to pass through the grating structure and an interval between the adjacent shelters, a photosensitive component receiving the light emitted from the planar light source passing through the grating structure and the interval between the adjacent shelters so as to generate a corresponding optical intensity signal, and moving the grating structure according to the optical intensity signal generated by the photosensitive component.

According to the claimed invention, the stereoscopic image printing method further includes receiving a target image datum, setting correlation of the target image datum and the grating structure, and transferring the target image datum onto a corresponding position of the grating structure when moving the grating structure.

According to the claimed invention, the stereoscopic image printing method further includes transferring the target image datum onto the corresponding position of the grating structure according to the optical intensity signal generated by the photosensitive component when moving the grating structure.

According to the claimed invention, receiving the target image datum comprises receiving an interlaced image datum.

According to the claimed invention, moving the grating structure relative to the plurality of shelters comprises moving the grating structure relative to the plurality of shelters along a direction substantially perpendicular to an orientation of the shelters.

The stereoscopic image printing device and the related printing method of the present invention utilizes the single point photosensitive component to receive the light emitted from the planar light source passing through the grating structure and the interval between the adjacent shelters, so as to generate the corresponding optical intensity signal by moving the grating structure relative to the plurality of shelters. The positioning module of the present invention has advantages of simple structure, small volume and low cost. In addition, positioning process of the positioning module is easily and signal process of the positioning module is fast, so that the present invention has enhanced positioning accuracy when printing the stereoscopic image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
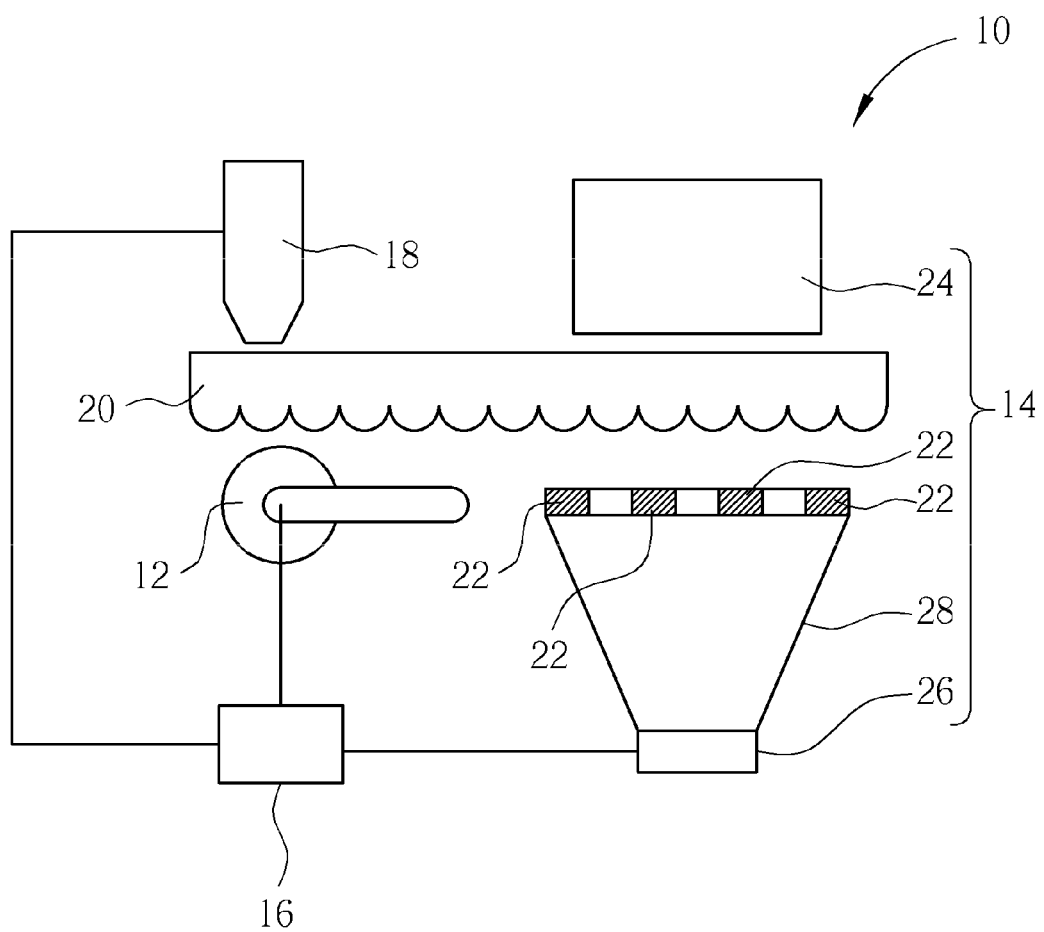
FIG. 1 is a diagram of a stereoscopic image printing device according to an embodiment of the present invention.

Please refer to FIG. 1. FIG. 1 is a diagram of a stereoscopic image printing device 10 according to an embodiment of the present invention. The stereoscopic image printing device 10 includes an actuating unit 12, a positioning module 14, a controlling unit 16 and a print heat 18. The actuating unit 12 is for moving a grating structure 20. The positioning module 14 detects a position of the grating structure 20. The controlling unit 16 is coupled to the actuating unit 12, the positioning module 14 and the print heat 18 for controlling the actuating unit 12 to move the grating structure 20 according to a signal generated by the positioning module 14, and for driving the print head 18 to transfer a target image datum onto a corresponding position of the grating structure 20, so that the stereoscopic image printing device 10 of the present invention has enhanced positioning accuracy. The target image datum can be an interlaced image datum.

The positioning module 14 includes a plurality of shelters 22, a planar light source 24, a photosensitive component 26 and a condenser 28. The plurality of shelters 22 is disposed on a side of the grating structure 20. The planar light source 24 is disposed on the other side of the grating structure 20 for emitting light to pass through the grating structure 20 and intervals between the adjacent shelters 22. The photosensitive component 26 is disposed on the side of the grating structure 20, which means the photosensitive component 26 is on the same side with the plurality of shelters 22, and is for receiving the light emitted from the planar light source 24 and then passing through the grating structure 20 and the intervals between the adjacent shelters 22, so as to generate a corresponding optical intensity signal. For example, the photosensitive component 26 can be a single point photosensitive component, such as a photodiode or a photoresistor, and the optical intensity signal generated by the single point photosensitive component can substantially conform to a sine wave single. The condenser 28 is disposed between the plurality of shelters 22 and the photosensitive component 26 for collecting the light emitted from the planar light source 24 and passing through the grating structure 20 and the intervals between the adjacent shelters 22 for the photosensitive component 26, so as to prevent the photosensitive component 26 from being interfered by external noise.

Figure 2:
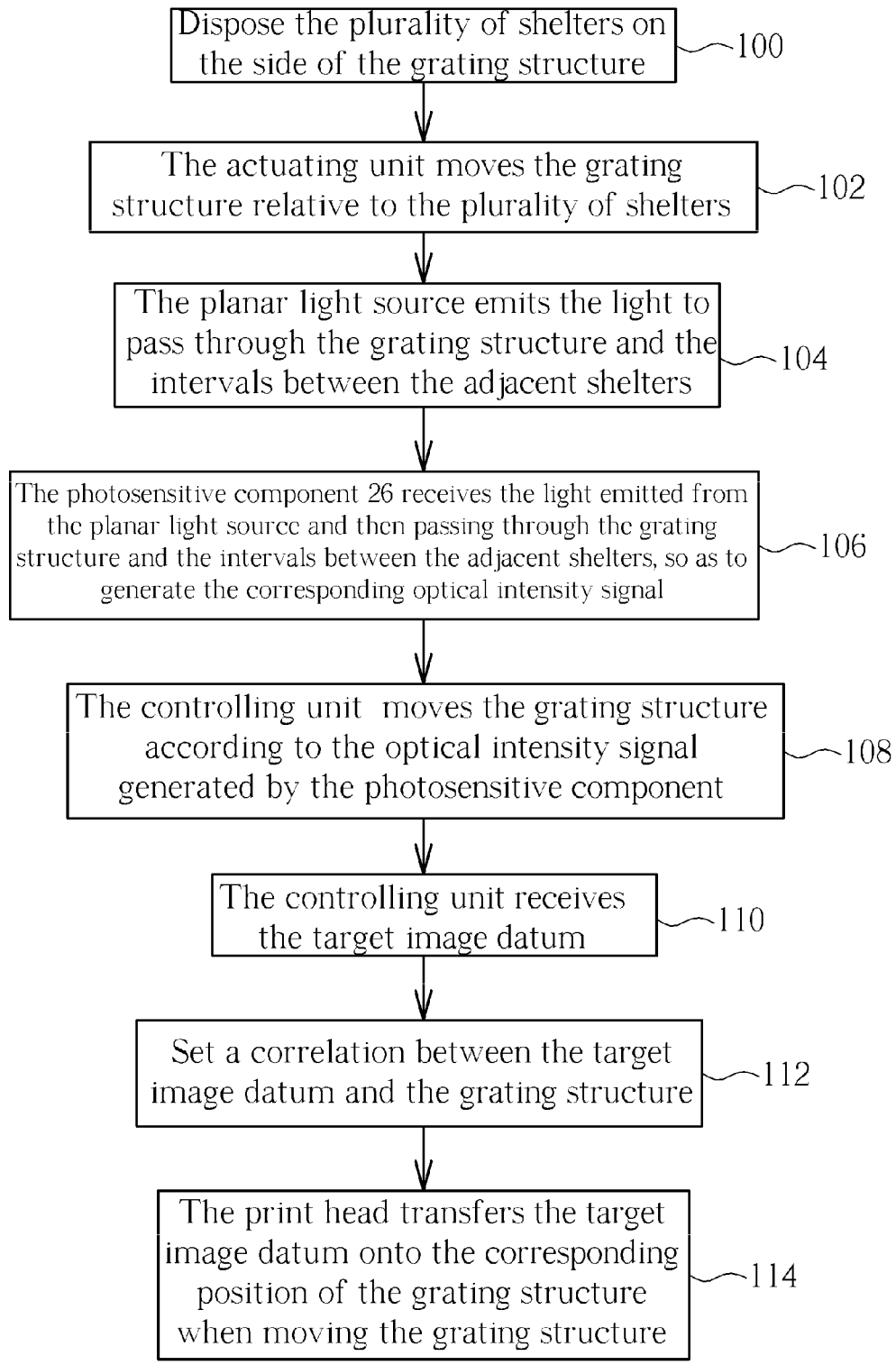
FIG. 2 is a flow chart of a stereoscopic image printing method according to the embodiment of the present invention.

Please refer to FIG. 2. FIG. 2 is a flow chart of a stereoscopic image printing method according to the embodiment of the present invention. The method includes following steps:

Step 100: Dispose the plurality of shelters 22 on the side of the grating structure 20.

Step 102: The actuating unit 12 moves the grating structure 20 relative to the plurality of shelters 22.

Step 104: The planar light source 24 emits the light to pass through the grating structure 20 and the intervals between the adjacent shelters 22.

Step 106: The photosensitive component 26 receives the light emitted from the planar light source 24 and then passing through the grating structure 20 and the intervals between the adjacent shelters 22, so as to generate the corresponding optical intensity signal.

Step 108: The controlling unit 16 controls the actuating unit 12 to move the grating structure 20 according to the optical intensity signal generated by the photosensitive component 26.

Step 110: The controlling unit 16 receives the target image datum.

Step 112: Set a correlation between the target image datum and the grating structure 20.

Step 114: The print head 18 transfers the target image datum onto the corresponding position of the grating structure 20 when moving the grating structure 20.

Figure 3:
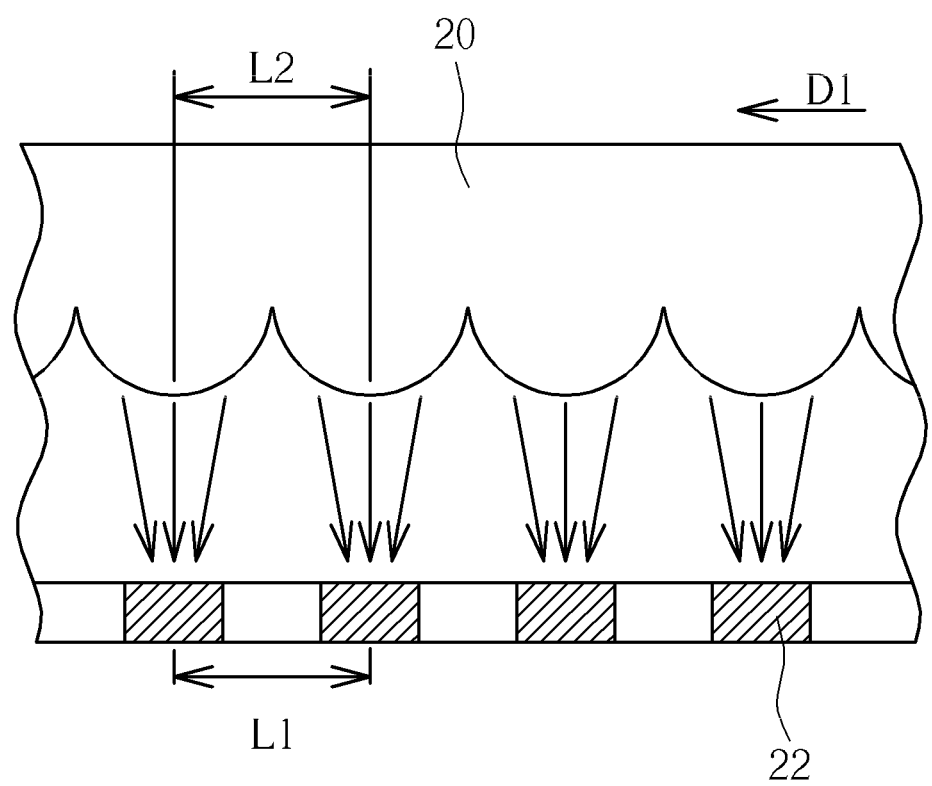
FIG. 3 and FIG. 4 are diagrams of a grating structure and shelters in different relative positions according to the embodiment of the present invention.
Figure 4:
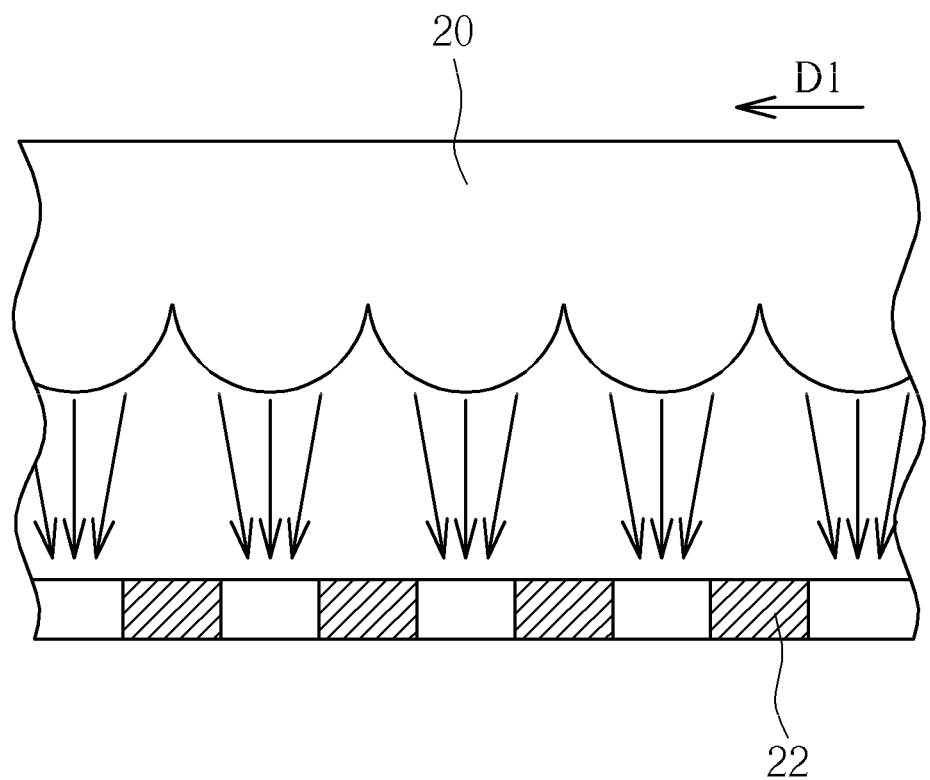

The method is introduced in detail as follows. First, the planar light source 24 and the photosensitive component 26 are respectively disposed on two sides of the grating structure 20. The photosensitive component 26 receives the light emitted from the planar light source 24 with the condenser 28, and the condenser 28 is disposed on the side of the grating structure 20 whereon the photosensitive component 26 is disposed. Please refer to FIG. 3 and FIG. 4. FIG. 3 and FIG. 4 are diagrams of the grating structure 20 and the shelters 22 in different relative positions according to the embodiment of the present invention. The shelter 22 blocks the partial light emitted from the planar light source 24, so that the photosensitive component 26 can receive the optical intensity signal having amplitude variation with penetration of the unblocked light. Therefore, a width of each shelter 22 is substantially smaller than a grating width of the grating structure 20, and a distance of the adjacent shelters 22 is substantially equal to a grating distance of the grating structure 20. For example, as shown in FIG. 3, the distance of the adjacent shelters 22 L1 can be equal to the distance of the adjacent gratings L2. The light emitted from the planar light source 24 can pass through the grating structure 20 and the intervals between the adjacent shelters 22, and then is received by the photosensitive component 26.

The actuating unit 12 moves the grating structure 20 relative to the shelters 22 along a direction perpendicular to an arrangement of the shelters 22 (indicated as an arrow shown in FIG. 3 and FIG. 4). Due to condensation function of the grating structure 20, the plurality of shelters 22 blocks most of the light passing through the grating structure 20 when the grating structure 20 moves relative to the shelters 22 to a position as shown in FIG. 3, so that the photosensitive component 26 generates the optical intensity signal having small amplitude as receiving the weak light emitted from the planar light source 24 and passing through the grating structure 20 and the intervals between the adjacent shelters 22. When the grating structure 20 moves relative to the shelters 22 to a position as shown in FIG. 4, the plurality of shelters 22 does not block the light passing the grating structure 20, so the photosensitive component 26 generates the optical intensity signal having great amplitude as receiving the strong light emitted from the planar light source 24 and passing through the grating structure 20 and the intervals between the adjacent shelters 22. Thus, the photosensitive component 26 can generate the corresponding optical intensity signal according to illumination variation when the grating structure 20 moves relative to the plurality of shelters 22. For example, the optical intensity signal can substantially conform to the sine wave signal.

The controlling unit 16 receives the target image datum, and sets the correlation between the target image datum and the grating structure 20. The controlling unit 16 controls the actuating unit 12 to move the grating structure 20 according to the optical intensity signal (such as the sine wave signal) generated by the photosensitive component 26, so that the print head 18 can transfer the target image datum onto the corresponding position of the grating structure 20 precisely. That is to say, the optical intensity signal generated by the photosensitive component 26 can be a reference for determining whether the target image datum correctly matches with the grating structure 20. As the print head 18 fails to transfer the target image datum onto the grating structure 20 correctly, for example, due to deformation of the grating structure 20 or slip of the actuating unit 12, the controlling unit 16 can determine a deviation of the target image datum and the grating structure 20 according to the optical intensity signal generated by the photosensitive component 26, so as to control the actuating unit 12 to adjust movement of the grating structure 20 according to the optical intensity signal for optimizing the target image datum relative to the grating structure 20. In the embodiment of the present invention, the positioning module 14 can generate the sine wave signal having amplitude variation according to the relative position change of the grating structure 20 and the shelters 22, so that the controlling unit 16 can determine moving parameters of the grating structure 20, such as the speed, the distance and the direction, by analyzing the sine wave signal. Thus, the stereoscopic image printing device 10 of the present invention can utilize the sine wave signal to be the positioning reference when printing the stereoscopic image, so as to transfer the target image datum onto the corresponding position of the grating structure 20 precisely.

Comparing to the prior art, the stereoscopic image printing device and the related printing method of the present invention utilizes the single point photosensitive component to receive the light emitted from the planar light source and passing through the grating structure and the intervals between the adjacent shelters, so as to generate the corresponding optical intensity signal by moving the grating structure relative to the plurality of shelters. The positioning module of the present invention has advantages of simple structure, small volume and low cost. In addition, positioning process of the positioning module is easily and signal process of the positioning module is fast, so that the present invention has enhanced positioning accuracy when printing the stereoscopic image.

Those skilled in the art will readily observe that numerous modifications and alterations of the device and method may be made while retaining the teachings of the invention.

What is claimed is:

1. A stereoscopic image printing device comprising: an actuating unit for moving a grating structure; a positioning module comprising: a plurality of shelters disposed on a side of the grating structure; a planar light source disposed on the other side of the grating structure for emitting light to pass through the grating structure and an interval between the adjacent shelters; and a photosensitive component disposed on the side of the grating structure for receiving the light emitted from the planar light source passing through the grating structure and the interval between the adjacent shelters so as to generate a corresponding optical intensity signal; and a controlling unit coupled to the actuating unit and the photosensitive component for controlling the actuating unit to move the grating structure according to the optical intensity signal generated by the photosensitive component.

2. The stereoscopic image printing device of claim 1, further comprising:
a print head coupled to the controlling unit for transferring a target image datum onto a corresponding position of the grating structure according to a control signal transmitted from the controlling unit.

3. The stereoscopic image printing device of claim 2, wherein the target image datum is an interlaced image datum.

4. The stereoscopic image printing device of claim 1, wherein the photosensitive component is a single point photosensitive component, and the optical intensity signal generated by the single point photosensitive component substantially conforms to a sine wave signal.

5. The stereoscopic image printing device of claim 1, wherein the positioning module further comprises a condenser disposed between the plurality of shelters and the photosensitive component.

6. The stereoscopic image printing device of claim 1, wherein a width of each shelter is substantially smaller than a grating width of the grating structure.

7. The stereoscopic image printing device of claim 1, wherein a distance between the adjacent shelters is substantially equal to a distance between the adjacent gratings of the grating structure.

8. The stereoscopic image printing device of claim 1, wherein a moving direction of the grating structure is substantially perpendicular to an orientation of the shelters.

9. A stereoscopic image printing method comprising: disposing a plurality of shelters on a side of a grating structure; moving the grating structure relative to the plurality of shelters; a planar light source emitting light to pass through the grating structure and an interval between the adjacent shelters; a photosensitive component receiving the light emitted from the planar light source passing through the grating structure and the interval between the adjacent shelters so as to generate a corresponding optical intensity signal; and moving the grating structure according to the optical intensity signal generated by the photosensitive component.

10. The stereoscopic image printing method of claim 9, further comprising: receiving a target image datum; setting correlation of the target image datum and the grating structure; and transferring the target image datum onto a corresponding position of the grating structure when moving the grating structure.

11. The stereoscopic image printing method of claim 10, further comprising: transferring the target image datum onto the corresponding position of the grating structure according to the optical intensity signal generated by the photosensitive component when moving the grating structure.

12. The stereoscopic image printing method of claim 10, wherein receiving the target image datum comprises receiving an interlaced image datum.

13. The stereoscopic image printing method of claim 9, wherein moving the grating structure relative to the plurality of shelters comprises moving the grating structure relative to the plurality of shelters along a direction substantially perpendicular to an orientation of the shelters.

* * * * *